United States Patent
Lange et al.

(10) Patent No.: US 10,198,578 B2
(45) Date of Patent: Feb. 5, 2019

(54) SECURE PRIVILEGE LEVEL EXECUTION AND ACCESS PROTECTION

(71) Applicant: Microsoft Technology Licensing, LLC, Redmond, WA (US)

(72) Inventors: Jonathan E. Lange, Seattle, WA (US); John V. Sell, Los Altos, CA (US); Ling Tony Chen, Bellevue, WA (US); Eric O. Mejdrich, Preston, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/369,874

(22) Filed: Dec. 5, 2016

(65) Prior Publication Data

US 2017/0193226 A1 Jul. 6, 2017

Related U.S. Application Data

(63) Continuation of application No. 13/918,852, filed on Jun. 14, 2013, now Pat. No. 9,530,000.

(51) Int. Cl.
G06F 21/55 (2013.01)
G06F 12/14 (2006.01)
(Continued)

(52) U.S. Cl.
CPC ........ G06F 21/554 (2013.01); G06F 12/1441 (2013.01); G06F 12/1483 (2013.01);
(Continued)

(58) Field of Classification Search
CPC ......... G06F 12/0246; G06F 2212/7201; G06F 2212/7202; G06F 11/1004; G06F 11/1008;
(Continued)

(56) References Cited

U.S. PATENT DOCUMENTS 3,916,385 A * 10/1975 Parmar ............... G06F 12/1491
711/109
4,084,224 A * 4/1978 Appell ..................... G06F 9/52
711/153
(Continued)

FOREIGN PATENT DOCUMENTS

CN 1342937 A 4/2002
CN 1373425 A 10/2002
(Continued)

OTHER PUBLICATIONS

"Final Office Action Issued in U.S. Appl. No. 13/918,852", dated Apr. 12, 2016, 19 Pages.
(Continued)

*Primary Examiner* — Mardochee Chery (57) ABSTRACT

The subject disclosure is directed towards using one or more of hardware, a hypervisor, and privileged mode code to prevent system mode code from accessing user mode data and/or running user mode code at the system privilege level, or vice-versa. Also described is (in systems with a hypervisor) preventing non-hypervisor code from running in hypervisor mode or accessing hypervisor-only data, or vice-versa. A register maintained by hardware, hypervisor, or system mode code contains data access and execution polices for different chunks of addressable space with respect to which requesting entities (hypervisor mode code, system mode code, user mode code) have access to or can execute code in a given chunk. When a request to execute code or access data with respect to an address is received, the request is processed to determine to which chunk the address corresponds. The policy for that chunk is evaluated to determine whether to allow or deny the request.

20 Claims, 9 Drawing Sheets

(51) Int. Cl.
*H04L 29/06* (2006.01)
*G06F 11/10* (2006.01)
*G06F 12/02* (2006.01)

(52) U.S. Cl.
CPC .......... *G06F 12/1491* (2013.01); *H04L 63/10* (2013.01); *G06F 11/1004* (2013.01); *G06F 11/1008* (2013.01); *G06F 12/0246* (2013.01); *G06F 2212/1032* (2013.01); *G06F 2212/1052* (2013.01); *G06F 2212/151* (2013.01); *G06F 2221/031* (2013.01)

(58) Field of Classification Search
CPC .............. G06F 12/1491; G06F 21/554; G06F 2212/1032; G06F 2212/151
USPC ........................................................ 711/163
See application file for complete search history.

(56) References Cited

U.S. PATENT DOCUMENTS

| | | | | |
|---|---|---|---|---|
| 4,297,743 | A * | 10/1981 | Appell | G06F 9/4486 718/106 |
| 5,140,684 | A | 8/1992 | Sakamura et al. | |
| 5,457,789 | A * | 10/1995 | Dietrich, Jr. | G06F 9/5016 711/100 |
| 6,256,715 | B1 * | 7/2001 | Hansen | G06F 12/0284 711/152 |
| 6,438,659 | B1 * | 8/2002 | Bauman | G06F 12/0817 711/141 |
| 6,745,307 | B2 | 6/2004 | McKee | |
| 8,266,412 | B2 * | 9/2012 | Glew | G06F 9/3012 712/220 |
| 8,447,904 | B2 | 5/2013 | Riddoch | |
| 8,972,746 | B2 | 3/2015 | Johnson et al. | |
| 9,465,750 | B2 | 10/2016 | Nakada et al. | |
| 2007/0204265 | A1 | 8/2007 | Oshins | |
| 2007/0239953 | A1 | 10/2007 | Savagaonkar et al. | |
| 2009/0119487 | A1 * | 5/2009 | Hosoda | G06F 9/381 712/205 |
| 2009/0222816 | A1 | 9/2009 | Mansell et al. | |
| 2010/0106954 | A1 | 4/2010 | Muchsel et al. | |
| 2011/0307447 | A1 * | 12/2011 | Sabaa | H04L 67/2842 707/637 |
| 2011/0307659 | A1 * | 12/2011 | Hans | G06F 3/0613 711/114 |
| 2012/0191933 | A1 * | 7/2012 | Zbiciak | G06F 13/366 711/163 |
| 2013/0290778 | A1 | 10/2013 | Soderlund et al. | |
| 2013/0318051 | A1 * | 11/2013 | Kumar | G06F 17/30156 707/692 |
| 2014/0040593 | A1 | 2/2014 | Sharp et al. | |
| 2014/0115182 | A1 * | 4/2014 | Sabaa | H04L 67/1097 709/232 |
| 2015/0199198 | A1 | 7/2015 | Ven et al. | |

FOREIGN PATENT DOCUMENTS

| | | |
|---|---|---|
| CN | 1701311 A | 11/2005 |
| CN | 101390079 A | 3/2009 |
| CN | 102592083 A | 7/2012 |
| JP | 05100957 A | 4/1993 |

OTHER PUBLICATIONS

"Non Final Office Action Issued in U.S. Appl. No. 13/918,852", dated Sep. 16, 2015, 13 Pages.
"Notice of Allowance Issued in U.S. Appl. No. 13/918,852", dated Aug. 17, 2016, 5 Pages.
"Office Action Issued in European Patent Application No. 14737406.0", dated Oct. 6, 2016, 4 Pages.
"Office Action and Search Report Issued in Chinese Patent Application No. 201480033836.X", dated Oct. 10, 2017, 13 Pages.
Brannock, et al., "Providing a Safe Execution Environment", In Journal of Intel Technology, vol. 13, Issue 2, Sep. 15, 2009, 17 Pages.
"International Preliminary Report on Patentability Issued in PCT Patent Application No. PCT/US2014/041985", dated Sep. 1, 2015, 7 Pages.
"International Search Report & Written Opinion Issued in PCT Patent Application No. PCT/US2014/041985", dated Sep. 30, 2014, 8 Pages.
"Second Written Opinion Issued in PCT Patent Application No. PCT/US2014/041985", dated Mar. 23, 2015, 6 Pages.
"Office Action Issued in European Patent Application No. 14737406.0", dated Feb. 2, 2018, 4 Pages.
"Office Action Issued in Chinese Patent Application No. 201480033836.X", dated Mar. 27, 2018, 6 Pages.

* cited by examiner

SECURE PRIVILEGE LEVEL EXECUTION AND ACCESS PROTECTION

CROSS-REFERENCE TO RELATED APPLICATION

The present application is a continuation of U.S. application Ser. No. 13/918,852 filed on Jun. 14, 2013 and is hereby incorporated by reference herein for all intents and purposes.

BACKGROUND

Attacks on computer systems are well known. One of the early ways to prevent attacks (as well as to prevent poorly written code from causing problems) was to run user applications in user mode code at a low privilege level, and run system (sometimes referred to as privileged, kernel or supervisor) mode code at a high privilege level.

In general, system mode code running at system privilege level can access virtually any computing resource whereas user mode code cannot. Thus, one common contemporary attack is based upon tricking system mode code via a bug into running user mode code with a system privilege level. Through various exploits such as buffer overflows, the system mode code jumps into or returns to what is actually malicious user mode code that then takes over the flow of execution, with system mode privileges. The attack is based on the concept that while user mode code cannot access system mode data or run in system mode, the converse is not true.

Recent hardware features referred to as Supervisor Mode Access Prevention (SMAP) and Supervisor Mode Execution Prevention (SMEP) attempt to control data and execution access of supervisor mode code. However, these features do not protect against a wide class of attacks, in part because of susceptibility to mistakes in the page tables. Moreover, these features deal with user mode versus supervisor mode, and do not make any distinction for code that runs in hypervisor mode.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards preventing (e.g., via logic such as in hardware or a hypervisor) access and/or execution by code running in another mode or running at a different privilege level. In one aspect, addressable memory space is separated into chunks, with at least some of the chunks associated with policy settings that identify one or more execution capabilities and/or one more access capabilities of the chunks. At least one policy setting indicates whether code in the chunk is executable at a system privilege level or not, or whether data in the chunk is accessible as system mode data or not. A request to execute code or access data is processed, with the request having an indication of a privilege level of the request.

Enforcing whether code execution or data access is allowed for the request is performed, e.g., by enforcement logic in hardware and/or software. Enforcing includes identifying a chunk with which the request is associated, accessing the policy settings to determine the execution or data access capability of the chunk, and allowing or denying the request based upon the privilege level, whether the request is to execute code or access data and the capability of the chunk with which the request is associated.

In one aspect, a hypervisor coupled to guest software includes enforcement logic (implemented in hardware and/or software) configured to prevent other code from executing in another mode or at a higher privilege level than a mode to which a source of the other code corresponds. The enforcement logic evaluates a request from a source related to code execution at an address against execution capability data maintained for chunks of address spaces, to determine whether the address corresponds to a chunk in which the source is allowed to execute code. In one aspect, the enforcement logic is further configured to evaluate a request from a source related to data access at an address against data access information maintained for chunks of address spaces to determine whether the address corresponds to a chunk in which the source is allowed to access data.

In one implementation, code execution and data access policies are enforced at a hypervisor and/or hardware, including by processing a request related to code execution or data access to evaluate a source of the request and an address associated with the request against policy settings. The hypervisor and/or hardware determines whether the request is allowed or denied for the source at the address associated with the request.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards having the CPU software that controls the physical allocation of memory control its own access and execution and the access and execution of software running at lesser privilege levels. Examples of software that controls physical memory allocation comprise a hypervisor that manages virtual machines/virtualization, or the operating system when there is no hypervisor/virtualization.

In one aspect, access/execution is controlled regardless of any inadvertent or overt actions of lesser privilege level software at any time. Examples of this include enforcing user mode software to execute in user mode only with no other access, and system mode software to execute in system mode only with no other access. As a result, even if a bug or other malicious attack attempts to cause system mode software to jump into or return to a user mode address, execution is prevented. Data access may be similarly limited.

In one aspect, access/execution of the code is controlled after establishing permitted access. For example, hypervisor code is only able to execute in hypervisor-only mode, with no other access including hypervisor access to other modes. Data read/write access is limited to hypervisor mode only, with no other access to system data or user mode data allowed.

To this end, the hypervisor and/or other system mode (e.g., most-privileged) code links access capabilities to the privilege level, whereby logic (e.g., in hardware and/or in the hypervisor code) controls each type of access separately using existing memory management, e.g., at page granularity. As a result, this scheme has no direct impact on lesser privilege level software, and provides for compatibility with existing architectures with minimal hardware change.

In one aspect, the machine's virtual memory address space is divided into a number of chunks, such as eight, e.g., using three bits of the address space as a chunk identifier (e.g., "tag") or the like that refers to one of the chunks. Each chunk has attributes defined by the hypervisor/other system mode (e.g., most-privileged) code; e.g., one chunk may be designated for only user mode data pages, another for user mode execution pages. Another chunk may be designated for privileged mode data pages, one for privileged mode execution pages, one for hypervisor mode data pages, one for hypervisor mode execution pages, and so on. Once established, the hypervisor other system mode (e.g., most-privileged) code has the ability to lock these designations (e.g., maintained in one or more machine state registers for the hypervisor to read) until the next reboot.

When memory is allocated, the hypervisor/other system mode (e.g., most-privileged) code allocates space only from the chunk that applies to the requesting entity, e.g., a user execute chunk for user mode code allocation requests. When a request to access memory or execute code comes in, enforcement logic (e.g., in the hypervisor and/or hardware) enforces the designation associated with the request, e.g., system code can only execute in a system mode executable code chunk, hypervisor code can only execute in a hypervisor mode executable code chunk, and so on.

It should be understood that any of the examples herein are non-limiting. For example, a hypervisor is shown as establishing access policies in a virtualized machine, however in a machine without virtualization/a hypervisor, the operating system may perform similar operations. Further, various configurations of chunks and registers are exemplified, but alternative configurations are feasible. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computer protection in general.

Figure 1:
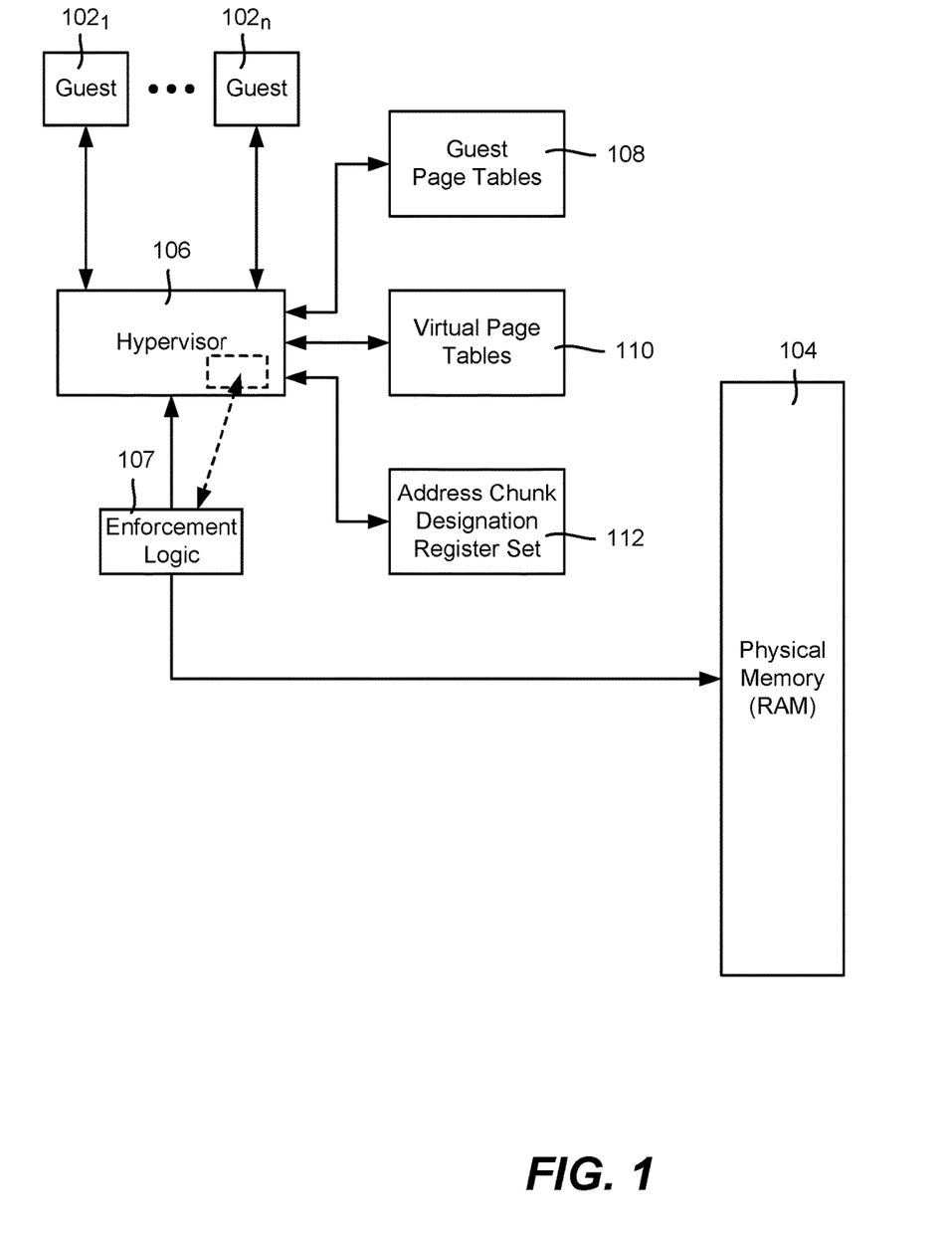
FIG. 1 is a block diagram representing example components for enforcing data access policies and code execution policies at a hypervisor logic or hardware logic coupled thereto, according to one example implementation.

FIG. 1 shows a generalized block diagram in which guest virtual machines $102_1$-$102_n$ request access to physical memory (RAM) 104. In general and as is known, a hypervisor 106 is responsible for mapping a guest-specified address to a guest physical address to the correct actual physical memory location in the RAM 104. The mapping is based upon a two-level translation using guest page tables 108 and virtual page tables 110. Known caching and other techniques are used to make this translation more efficient.

Described herein is dividing the addressable space into chunks, along with the use of a set of one or more registers 112 by the hypervisor to control access to data and/or code execution based upon the requesting entity. For example, when allocating memory space, consider that a guest requests address space for user mode executable code. Using existing verification techniques, if the requesting entity (e.g., the guest operating system for that user mode code) is verified, virtual address space is allocated from a particular chunk that designated as user mode executable code space, with the designation written to and tracked in the register set 112. Note that the register set 112 register set may comprise any accessible storage location that maintains execution and/or data access policy settings that may be evaluated to determine whether a source that makes an execution-related request or data access request is allowed to perform the requested operation.

Figure 2:
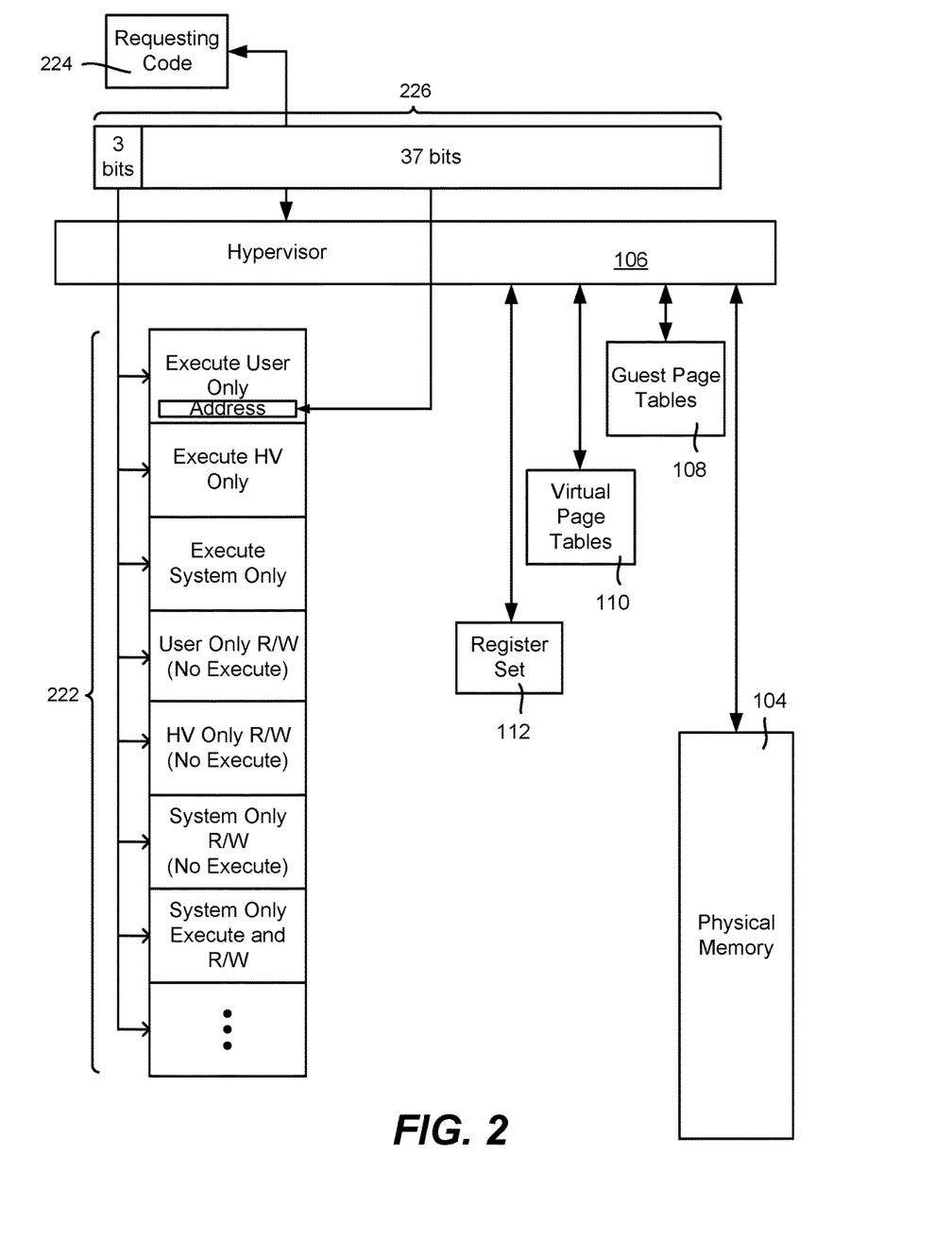
FIG. 2 is a representation of how addressable address space may be divided into chunks, with a chunk identified by an bits within an address, in which the chunks are associated with data access policies and code execution policies, according to one example implementation.

In one implementation, some number of bits (e.g., three) of each address (e.g., forty bits total) correspond to the chunk designation, e.g., as an chunk identifier (tag) that corresponds to one chunk. This example is generally represented in FIG. 2, where virtual address space (e.g., one terabyte) is divided into chunks 222 (eight in this example), with the first m bits (three in this example) acting as an identifier of one of the corresponding chunks. In the example of FIG. 2, there are seven different types of chunks 222 exemplified, namely execute user only, execute hypervisor only, execute system only, no execute user only R/W (data), no execute hypervisor only R/W (data), no execute system only R/W (data), and system only execute and R/W (data).

Further, note that one or more other chunks allow for other designations, e.g., instead of hypervisor mode execute and hypervisor mode R/W access (no execute), there may be a further distinction of hypervisor mode system privilege level execute, hypervisor mode user privilege level execute, hypervisor mode system data access/no-execute, and/or hypervisor mode user privilege level data access/no-execute designations. Still other designations are feasible, such as to have a chunk for digital rights management (DRM) data, a chunk for just-in-time (JIT) compiled code, and so on.

When the hypervisor 106 receives a code execution request or a data access request from requesting code 224 along with the requested address 226, whether from user mode code, system mode code or hypervisor mode code, the hypervisor 106 knows which entity is making the request and whether the request is directed to data access or to code execution. Note that the hypervisor 106 allocated or otherwise assigned the memory space (e.g., including the upper three bits as exemplified herein) at an earlier time based upon the type of requesting entity. The enforcement logic 107, which may be implemented in hardware and coupled to the hypervisor 106, (and/or may be in the hypervisor 106, shown via the dashed box), evaluates the upper three bits against the register set 112 to determine whether the entity and the type of request is allowed for this chunk. If so, the request is allowed to succeed, otherwise the request is failed.

In one embodiment, the hypervisor 106 initially sets all guest pages in the page table to no-execute via the execute/no-execute bit therein for each page. When a request comes in to execute code, the enforcement logic 107 checks the register to determine if execution is allowed at the corresponding page address for this requester/address, based upon the registry attributes for the type of requester, and either allows or denies the request. If allowed, the enforcement logic 107 also sets the page bit in the page table at that time to "execute" status so that the code may execute.

Note that instead of (or in addition) to a register or the like, it is feasible for the page tables to have one or more additional capability bits that specify data access and code execution according to privilege levels and/or modes. In other words, a programmable set of access designations may be added to the page tables that specify physical allocation of memory; a typical implementation modifies hypervisor page tables and adds additional information to cache, although guest operating system and user page tables, as well as caching, are unaffected.

However, such capability bits are not readily available with existing technologies, and thus existing page table schemes and/or existing hardware architectures need modification to implement such a capability bit set, making a new architecture solution less-than-desirable compared to using an existing architecture. Moreover, as page tables are maintained in main memory, such page table bits are also susceptible to attack or other corruption; in contrast, in one implementation, the register set 112 may be maintained in a processor location (e.g., processor hardware registers/model specific registers/CPU memory not subject to tampering) for additional security.

Moreover, the register set 112 may be locked. More particularly, the hypervisor 106 may write the attributes (e.g., represented by bit values) regarding designation of the chunks to the register set 112, and then lock the register set 112. Once locked, not even the hypervisor 106 can change the locked register set 112 during its operation (the register set remains locked until the next unlock event, which may be a reboot). Note that in a typical usage pattern, the hypervisor 106 sets up and locks the register set 112 as soon as possible after the hypervisor 106 begins running, so that any subsequently executed bugs or errors in hypervisor code cannot change the register set. As a result, a subsequent bug in the hypervisor code cannot be used to exploit the register-based security scheme, for example.

Note that the use of m bits (e.g., three bits) of the address 226 conveniently allows for efficient register lookup by the enforcement logic 107. This scheme results in each virtual chunk being the same size; e.g., with a three-bit identifier, each chunk is one-eighth of the addressable space after subtracting the three tag bits, e.g., $2^{37}$ bits for a forty bit address. Given the typical amounts of physical RAM used in contemporary devices and the amounts of RAM that typical programs need to address, reducing the addressable space by three bits is not problematic. Indeed, if desired even more bits may be used to allow for more chunk designations without running out of addresses for any type of requestor in a typical computing machine.

Notwithstanding, other schemes may be used, including a scheme having chunks of unequal size. For example, the hypervisor/register may track chunk boundaries as well as the designated capabilities of each chunk. Another scheme (one that basically allows for "chunks" of unequal size by combining chunks) may be to divide the addressable memory space into more chunks than needed for the various types of designation (at the cost of more identifier bits), but give certain chunks the same attributes/capabilities in the register set, with addressable memory allocated from among these same type of chunks accordingly. For example, there may be three chunks designated for "execute user mode only" and only one chunk for "execute hypervisor mode only." In this way, more chunk granularity is provided (as well as more possible chunk designations), such that an entity such as the hypervisor uses less of the addressable space relative to the addressable space useable by another entity.

As can be readily appreciated, the chunk identifier and register mechanism described herein avoids the need for any changes to existing page tables and/or any changes to the hardware caching of page table information. Pages of memory are assigned a desired chunk as part of their physical address to select the desired access designations. The hypervisor 106 controls these designations, and can lock various ones (or all) until the next reboot.

Note that existing access designations in the CPU architecture continue to operate unaffected, but are overridden by the new designations when the new designations are more restrictive. For example, consider that the execute bit for a page in the page tables allows code execution on that page, but the page is in a chunk that the hypervisor has designated as no execute. The enforcement logic 107, which handles execution-related requests, prevents code execution regardless of the execute bit setting for that page. Among other benefits, this prevents bugs, corruption or errors in the page tables from allowing improper execution.

One example implementation described herein is of a CPU architecture that supports forty (or more) physical address bits in its page tables and memory management hardware. Such architecture provides (at least) one terabyte of addressable space, which is significantly more than the amount of physical memory generally attached to the CPU. In one embodiment, the upper three address bits are used to select one of eight programmable sets of access designations. The remaining (e.g., thirty-seven) bits address the memory space within each set.

As described herein, in one embodiment, identified chunks of the address space are used to select a programmable set of access designations. In one implementation, at least one chunk contains (but is not necessarily limited to) hypervisor code and data. More particularly, the amount of memory used for hypervisor code and data is relatively small, and thus via a particular register 330 (FIG. 3) of the register set 112 along with one chunk is configured with individual page access designations for a part of the chunk. In one example implementation, two megabyte pages in the low portion of one of the chunks have individual access designations in hypervisor registers that apply when in hypervisor mode.

Note that there may be multiple sets of policies for a chunk or part of a chunk of actual memory. Part of a chunk may have policies, including because a chunk part may encompass the use of page tables to map individual pages of a chunk to different hardware and software (thread) requesters.

In one example implementation, one of the chunk parts is reserved for registers and other non-main memory storage accessible with CPU load and store operations. Accessing non-main memory storage with CPU load and store operations is commonly known as Memory-Mapped IO (MMIO). As described above, the registers alternatively may be in a more secure memory location external to main memory.

Various registers may be present for various purposes, including one for hypervisor access control (ASID zero). For example, in an implementation exemplified in FIG. 3, one of the registers of the register set 112 comprises a hypervisor-only sixty-four (64) bit machine state register 330, comprising two bits for each of the first thirty-two (32) two-megabyte pages of one of the chunk, shown in FIG. 3 as chunk 332. In other words, part of the chunk 332 is subdivided via another register 330 for use only by the hypervisor 106. There is one bit per page that allows hypervisor execution on the corresponding page if set to one (1), and disallows execution if cleared to zero (0). The other bit allows hypervisor read/write access if set to one (1), and disallows if zero (0). Thus, in the example of FIG. 3, Page 0 has an execution bit E0 (that may be set to one or zero) and a read/write bit RW0 (which may be set to one or zero), and so on for each page up to page 31. Note that the execution bits and read/write bits are exemplified in FIG. 3 as alternating, however it is feasible to have thirty two-execution bits in sequence followed by thirty read/write bits, and indeed, the register bits may be arranged in any workable order.

Figure 3:
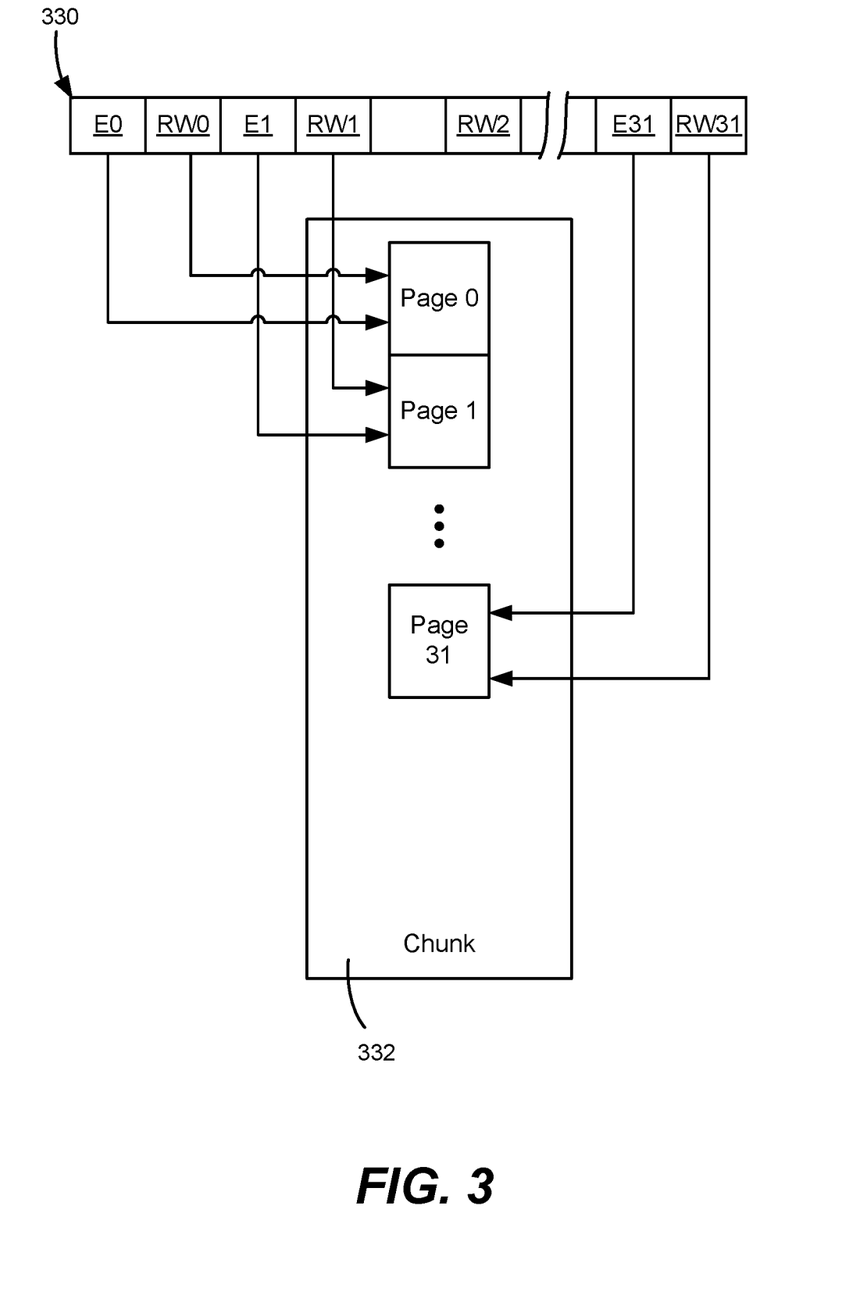
FIG. 3 is a representation of an example register that maintains page structure information within a chunk for use by a hypervisor or other system mode (e.g., most-privileged) code in maintaining and evaluating data access policies and code execution policies, according to one example implementation.

The hypervisor 106 can lock the state of the thirty-two (32) execution bits, and/or separately lock the thirty-two (32) read/write bits, until the next reset (reboot) if the hypervisor chooses to do so. The register 330 may be initialized to zero by resets, but this is not required.

Figure 4:
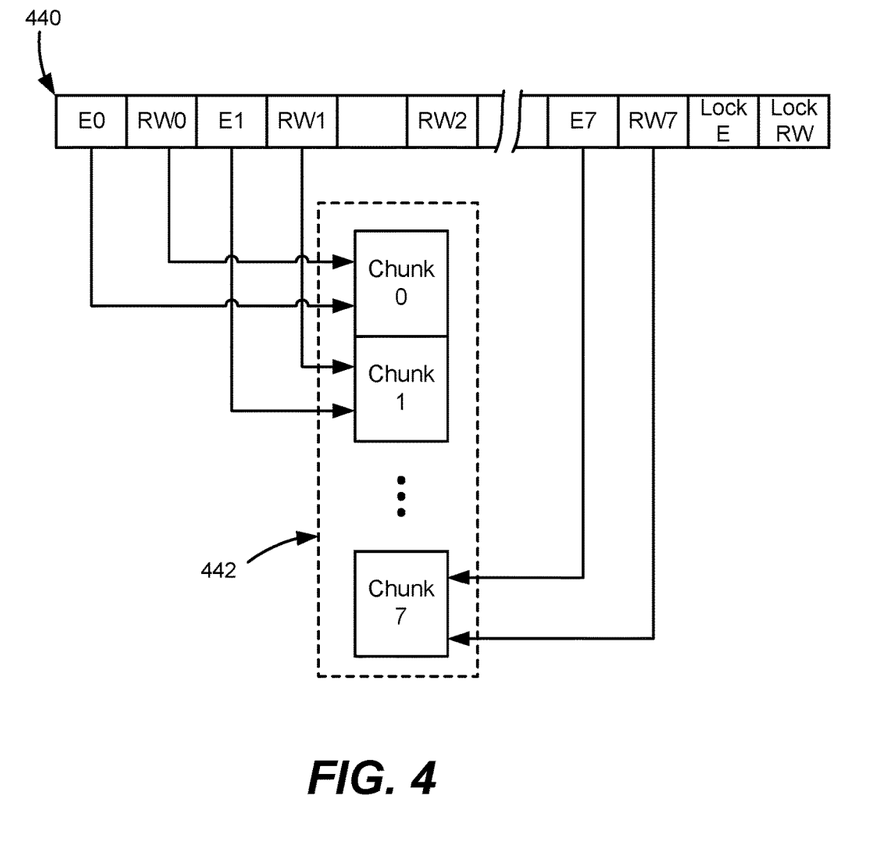
FIG. 4 is a representation of an example register that maintains chunk policy data for use by a hypervisor or other system mode (e.g., most-privileged) code in maintaining and evaluating hypervisor data access policies and code execution policies, according to one example implementation.

Another register is for controlling hypervisor execution and read/write access to each of the chunks. For example, if there are eight chunks, a hypervisor-only machine state register with eighteen (18) active bits may be used, as generally represented by the register 440 in FIG. 4 that is associated with the eight chunks 442 (chunk0 to chunk7). As can be seen in this example, there are two bits for each chunk; one bit allows hypervisor execution in the chunk corresponding to the identifier if set to one (1), or disallows execution if zero (0). The other bit allows hypervisor read/write access if set to one (1), or disallows read/write access if zero.

One of the remaining two bits (Lock E) is locks the state of the execution enable bits in the register 330 of FIG. 3 and the register 440 (FIG. 4) when set to one. The other bit (lock RW) locks the state of the read/write enable bits in the register 330 of FIG. 3 and the register 440 (FIG. 4) if set to one. The lock bits are initialized to zero by resets. The other bits may be initialized to zero by resets, but this is not required.

Figure 5:
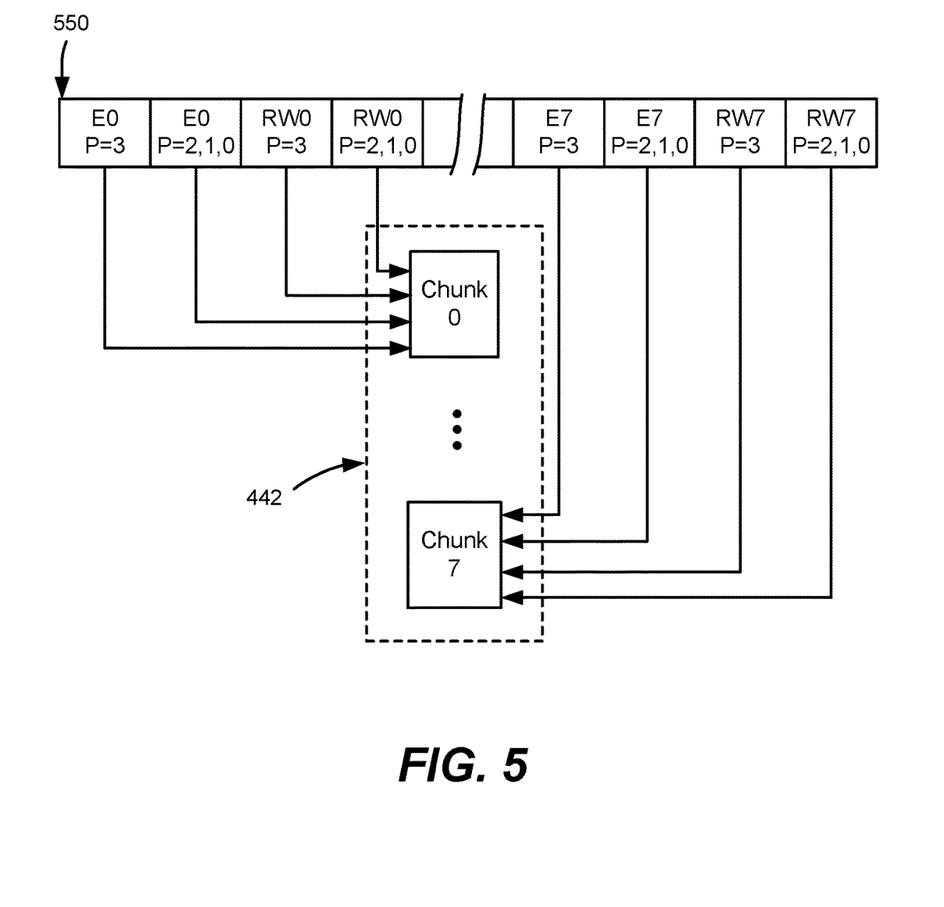
FIG. 5 is a representation of an example register that maintains chunk policy data for use by a hypervisor or other system mode (e.g., most-privileged) code in maintaining and evaluating user and system mode data access policies and code execution policies, according to one example implementation.

With respect to other (non-hypervisor) access control (ASID non-zero), FIG. 5 shows a hypervisor only thirty-two-bit machine state register 550 with four bits for each of the eight chunks 442. One bit allows Current Privilege Level (CPL)=3 (Ring 3 in x86 architectures) execution if set to one, and disallows execution if zero. A second bit allows CPL=0, 1, 2 (Ring 0, 1 or 2) execution if set to one, and disallows execution if zero. A third bit allows CPL=3 (Ring 3) read/write if set to one, and disallows read-write when zero. The fourth allows CPL=0, 1, 2 read/write if set to one and disallows if zero. The register 550 may be initialized to zero by resets, but this is not required. The register 550 may be part of the virtual machine state stored in the virtual machine control block, and loaded and stored as part of VMRUN/#VMEXIT and VMLOAD/VMSAVE, but this is also not required.

Figure 6:
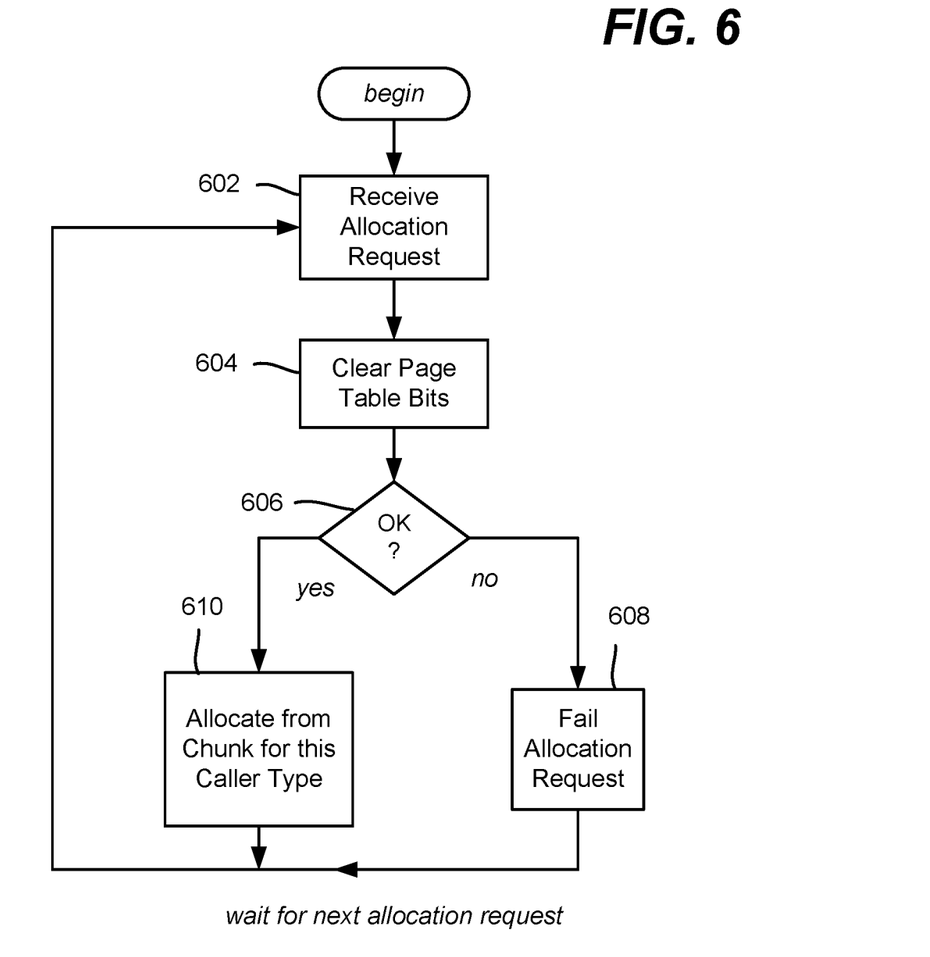
FIG. 6 is a flow diagram representing example steps that may be taken to allocate space from a hypervisor-selected chunk based upon a requesting entity and a type of request, according to one example implementation.

FIG. 6 is a flow diagram summarizing example steps that may be taken by a hypervisor/other system mode (e.g., most-privileged) code with respect to a memory allocation request, beginning at step 602. As described above, the hypervisor may clear any page table bits as desired, e.g., those that are related to allowing guest execution, as represented at step 604. In this way, no guest is able to execute code without enforcement logic approval.

Note that at system startup, non-hypervisor code and data may be first loaded into a chunk that allows no execution. If execution is requested, and the enforcement logic 107 (FIG. 1) allows execution for the request, the code may be copied into a chunk that is appropriate for executing the code based upon the system or user privilege level as appropriate for the requester. That is, the guest informs the hypervisor whether user or system mode execution is desired, and based upon the credentials, the enforcement logic 107 allows the request by copying the code into the user or system chunk. Execution is then allowed with the execution bit in the page tables set as appropriate, e.g., a page at a time.

Step 606 determines whether the request is "OK" according to any number of criteria. For example, space needs to be available to allocate or the request is failed. Moreover, one or more various mechanisms may be used to ensure that the requesting entity is authorized to make the request, e.g., that the guest operating system is from a legitimate source, has not been tampered with, and/or the like. For example, guest code may make a hypercall to the hypervisor, which checks a signature of the caller to authorize the request. If not, step 608 fails the request.

If the request is "OK" according to the one or more evaluation criteria at step 606, then step 610 is executed to allocate the space. The bits that are included in the returned allocation are set to the values that correspond to the request, e.g., an allowed user mode execute allocation request has the bits set to the chunk corresponding to user mode execute allocation as established in the bits within the register set for this chunk, e.g., (1, 0, 0, 0 in the scheme above), that is, Ring 3 execute, Ring 0, 1, 2 no-execute, Ring 3 no read/write, Ring 0, 1, 2 no read-write. Thereafter, via the identifier part of the address, any use of this address is limited by the hypervisor to only Ring 3 (user mode) code execution.

Figure 7:
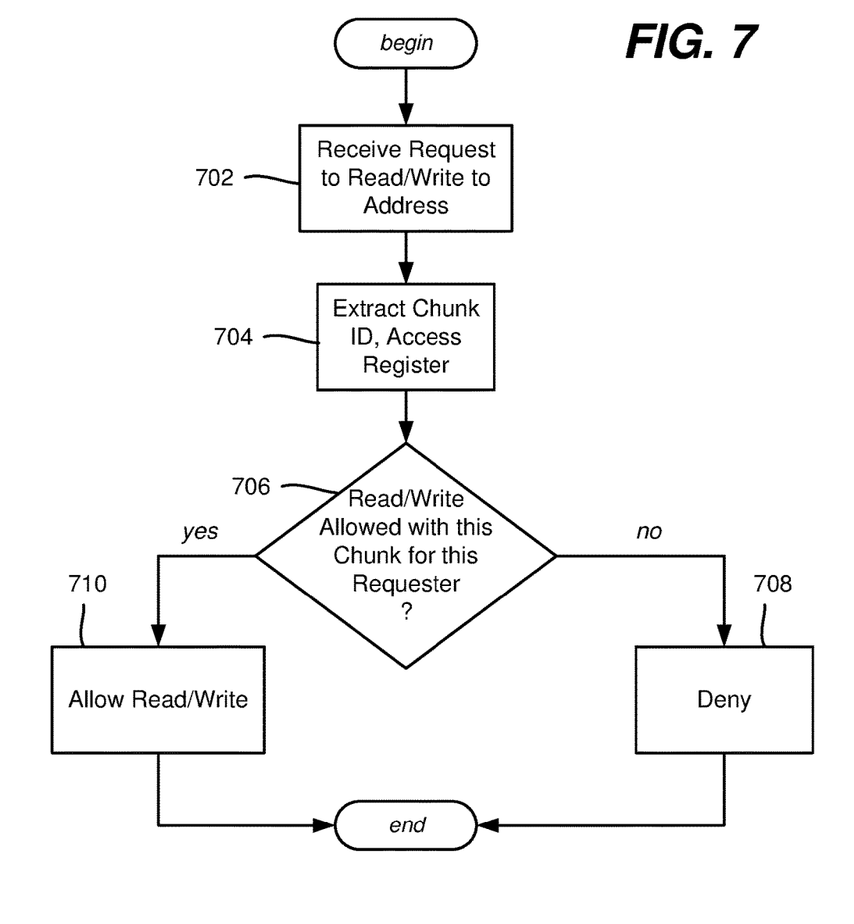
FIG. 7 is a flow diagram representing example steps that may be taken to enforce whether to allow or deny a data access request based upon an address associated with the request and a source of the requester, according to one example implementation.

FIG. 7 shows example logic with respect to enforcing a read/write data access request received at step 702 by the hypervisor. At step 704, the enforcement logic extracts the identifier bits from the address accompanying the request, and uses these bits to access the register set. For non-hypervisor access control, the register 550 may be read, for example, while for hypervisor access control, further registers (e.g., 330 and 440) may be read.

Step 706 represents evaluating whether read/write is allowed by the register settings for this address. If not step 708 denies the request. If so, step 710 allows the request; note that the page table bit may further deny a write.

Figure 8:
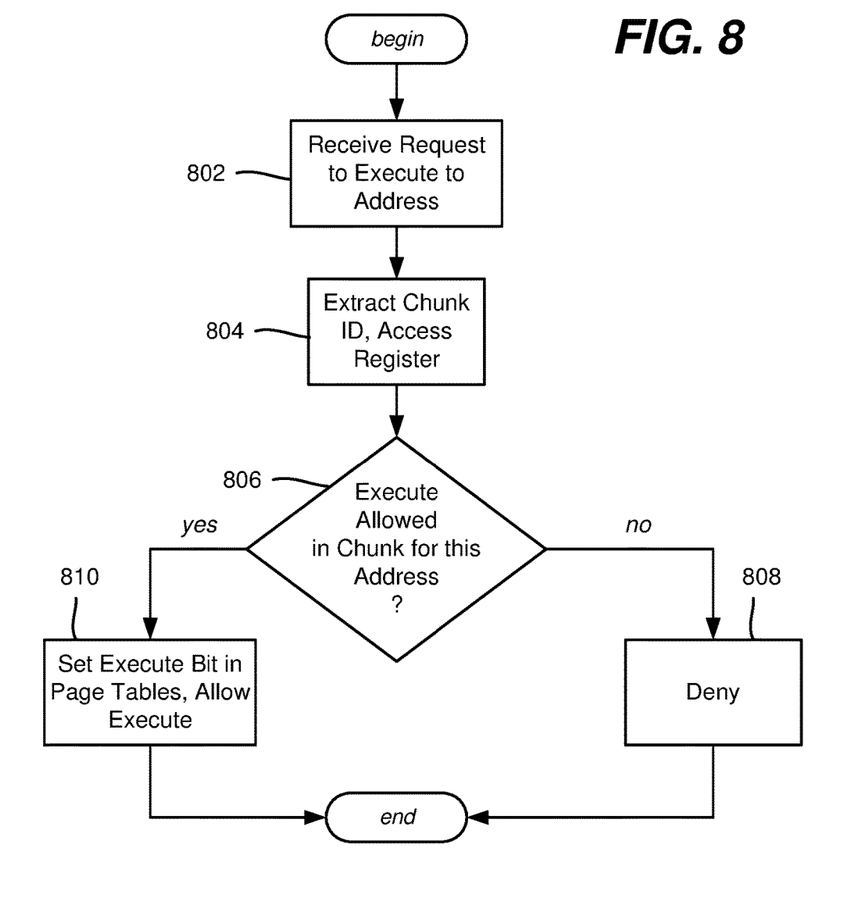
FIG. 8 is a flow diagram representing example steps that may be taken to enforce whether to allow or deny a request related to code execution based upon an address associated with the request and a source of the requester, according to one example implementation.

FIG. 8 is directed towards enforcement of an execution request received at step 782 802 by the hypervisor. At step 804, the enforcement logic extracts the identifier bits from the address accompanying the request, and uses these bits to access the register set. For non-hypervisor access control, the register 550 may be read, for example, while for hypervisor access control, further registers (e.g., 330 and 440) may be read.

Step 806 represents evaluating the register settings to determine whether execution is allowed by for this address. If not, step 808 denies the request, such as by clearing one or more page table bits. If so, step 810 sets the bit to one (which may still be cleared to zero via step 602 of FIG. 6) to allow the write in the page table for the appropriate page, and allows the request.

Example Operating Environment

Figure 9:
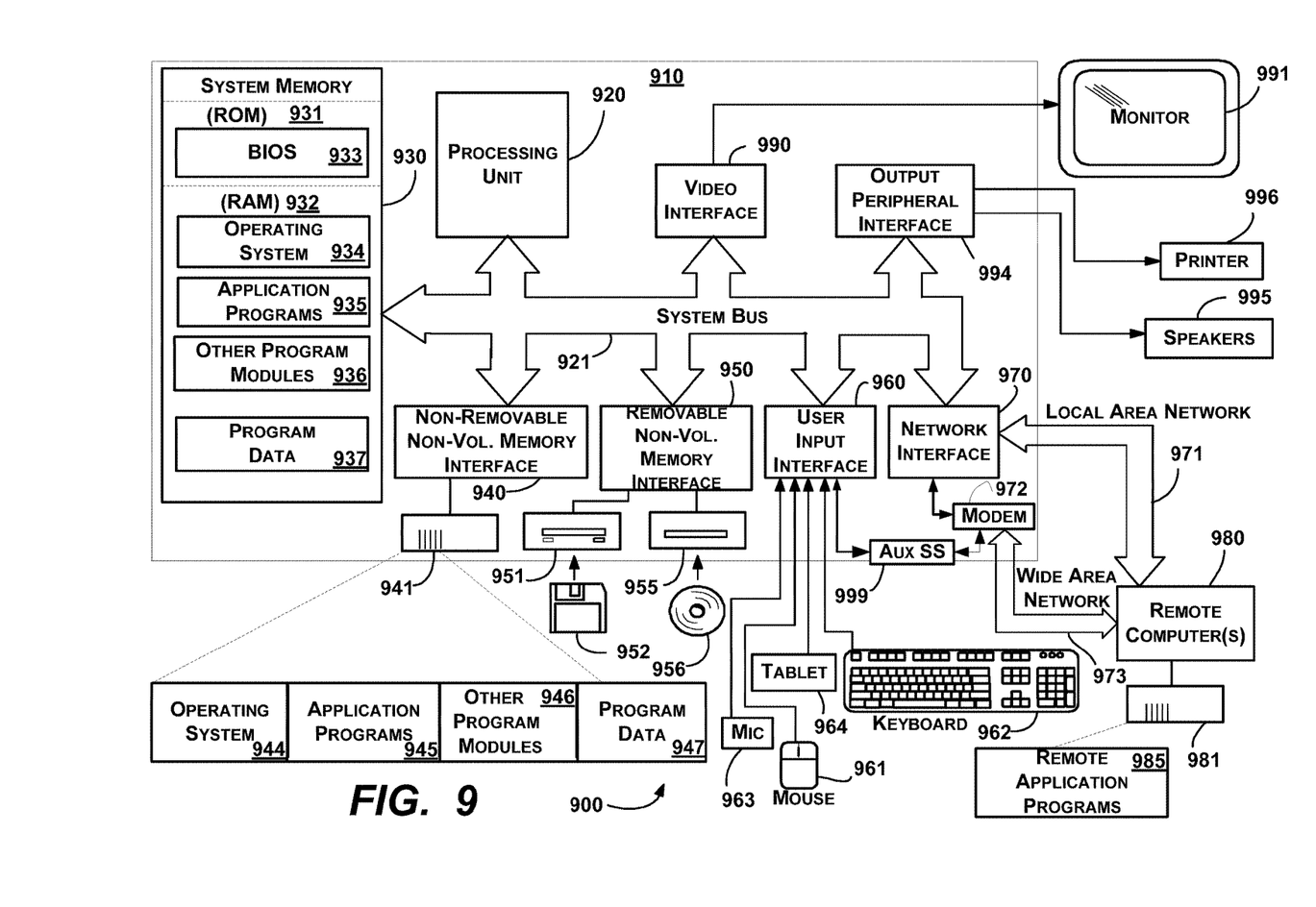
FIG. 9 is a block diagram representing an example non-limiting computing system and operating environment in which one or more aspects of various embodiments described herein can be implemented.

FIG. 9 illustrates an example of a suitable computing and networking environment 900 into which the examples and implementations of any of FIGS. 1-8 as well as any alternatives may be implemented. The computing system environment 900 is only one example of a suitable computing environment and is not intended to suggest any limitation as to the scope of use or functionality of the invention. Neither should the computing environment 900 be interpreted as having any dependency or requirement relating to any one or combination of components illustrated in the example operating environment 900.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 9, an example system for implementing various aspects of the invention may include a general purpose computing device in the form of a computer 910. Components of the computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 910 typically includes a variety of computer-readable media. Computer-readable media can be any available media that can be accessed by the computer 910 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 910. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936 (e.g., a hypervisor) and program data 937.

The computer 910 may also include other removable/non-removable, volatile/nonvolatile computer storage media. By way of example only, FIG. 9 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media, described above and illustrated in FIG. 9, provide storage of computer-readable instructions, data structures, program modules and other data for the computer 910. In FIG. 9, for example, hard disk drive 941 is illustrated as storing operating system 944, application programs 945, other program modules 946 (e.g., hypervisor code) and program data 947. Note that these components can either be the same as or different from operating system 934, application programs 935, other program modules 936, and program data 937. Operating system 944, application programs 945, other program modules 946, and program data 947 are given different numbers herein to illustrate that, at a minimum, they are different copies. A user may enter commands and information into the computer 910 through input devices such as a tablet, or electronic digitizer, 964, a microphone 963, a keyboard 962 and pointing device 961, commonly referred to as mouse, trackball or touch pad. Other input devices not shown in FIG. 9 may include a joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A monitor 991 or other type of display device is also connected to the system bus 921 via an interface, such as a video interface 990. The monitor 991 may also be integrated with a touch-screen panel or the like. Note that the monitor and/or touch screen panel can be physically coupled to a housing in which the computing device 910 is incorporated, such as in a tablet-type personal computer. In addition, computers such as the computing device 910 may also include other peripheral output devices such as speakers 995 and printer 996, which may be connected through an output peripheral interface 994 or the like.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 9. The logical connections depicted in FIG. 9 include one or more local area networks (LAN) 971 and one or more wide area networks (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960 or other appropriate mechanism. A wireless networking component such as comprising an interface and antenna may be coupled through a suitable device such as an access point or peer computer to a WAN or LAN. In a networked environment, program modules depicted relative to the computer 910, or portions thereof, may be stored in the remote memory storage device. By way of example, and not limitation, FIG. 9 illustrates remote application programs 985 as residing on memory device 981. It may be appreciated that the network connections shown are examples and other means of establishing a communications link between the computers may be used.

An auxiliary subsystem 999 (e.g., for auxiliary display of content) may be connected via the user interface 960 to allow data such as program content, system status and event notifications to be provided to the user, even if the main portions of the computer system are in a low power state. The auxiliary subsystem 999 may be connected to the modem 972 and/or network interface 970 to allow communication between these systems while the main processing unit 920 is in a low power state.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A system for enforcing code execution and data access policies comprising:
    enforcement logic configured to:
        determine an access designation and an execution designation of a plurality of chunks, each of the plurality of chunks comprising a plurality of bits of addressable memory space and policy settings that identify one or more execution capabilities and one or more access capabilities, wherein a policy setting for a first chunk from the plurality of chunks indicates that code in the first chunk is executable by a first source and not a second source, and wherein a policy setting for a second chunk indicates that code in the second chunk is executable by the second source and not the first source;
        receive a request from the first source related to code execution at an address against the access designation of a chunk from the plurality of chunks corresponding to the address by accessing policy settings for the chunk; and
        upon determining that the chunk is the first chunk, allow the request; or
        upon determining that the chunk is the second chuck, deny the request.

2. The system of claim 1, wherein the enforcement logic is incorporated in hardware or incorporated into one or more of the following: a hypervisor and system mode code, and wherein the source of the request comprises user mode code, system mode code, or hypervisor mode code.

3. The system of claim 1, wherein the enforcement logic is further configured to:
    evaluate a request from a source related to data access at an address against data access information maintained for chunks of address spaces; and
    determine whether the address corresponds to a chunk in which the source is allowed to access data.

4. The system of claim 1, wherein a subset of bits of the address identifies a chunk of a plurality of equal size chunks to which the address corresponds.

5. The system of claim 1, wherein at least two of the chunks of address spaces are different sizes from one another.

6. The system of claim 1, wherein access designations are maintained in a register set in memory or in a processor location.

7. The system of claim 1, wherein the access designation for the plurality of chunks includes information that indicates whether chunk code is executable at user privilege level only, at system privilege level only or in hypervisor mode only.

8. The system of claim 1, wherein the access designation for the plurality of chunks includes information that indicates whether chunk data is accessible at user privilege level only, at system privilege level only or in hypervisor mode only.

9. A method comprising:
determining an access designation and an execution designation of a plurality of chunks, each of the plurality of chunks comprising a plurality of bits of addressable memory space and policy settings that identify one or more execution capabilities and one or more access capabilities, wherein a policy setting for a first chunk from the plurality of chunks indicates that code in the first chunk is executable by a first source and not a second source, and wherein a policy setting for a second chunk indicates that code in the second chunk is executable by the second source and not the first source;
receiving a request from the first source related to code execution at an address against the access designation of a chunk from the plurality of chunks corresponding to the address by accessing policy settings for the chunk; and
upon determining that the chunk is the first chunk, allowing the request; or
upon determining that the chunk is the second chuck, denying the request.

10. The method of claim 9, wherein the enforcement logic is incorporated in hardware or incorporated into one or more of the following: a hypervisor and system mode code, and wherein the source of the request comprises user mode code, system mode code, or hypervisor mode code.

11. The method of claim 9, further comprising:
evaluating a request from a source related to data access at an address against data access information maintained for chunks of address spaces; and
determining whether the address corresponds to a chunk in which the source is allowed to access data.

12. The method of claim 9, wherein a subset of bits of the address identifies a chunk of a plurality of equal size chunks to which the address corresponds.

13. The method of claim 9, wherein at least two of the chunks of address spaces are different sizes from one another.

14. The method of claim 9, wherein access designations are maintained in a register set in memory or in a processor location.

15. The method of claim 9, wherein the access designation for the plurality of chunks includes information that indicates whether chunk code is executable or accessible at user privilege level only, at system privilege level only or in hypervisor mode only.

16. A computer-readable storage memory having computer-executable instructions that are configured, upon execution, perform operations comprising:
determining an access designation and an execution designation of a plurality of chunks, each of the plurality of chunks comprising a plurality of bits of addressable memory space and policy settings that identify one or more execution capabilities and one or more access capabilities, wherein a policy setting for a first chunk from the plurality of chunks indicates that code in the first chunk is executable by a first source and not a second source, and wherein a policy setting for a second chunk indicates that code in the second chunk is executable by the second source and not the first source;
receiving a request from the first source related to code execution at an address against the access designation of a chunk from the plurality of chunks corresponding to the address by accessing policy settings for the chunk; and
upon determining that the chunk is the first chunk, allowing the request; or
upon determining that the chunk is the second chuck, denying the request.

17. The computer-readable storage memory of claim 16, wherein the enforcement logic is incorporated in hardware or incorporated into one or more of the following: a hypervisor and system mode code, and wherein the first source of the request comprises user mode code, system mode code, or hypervisor mode code.

18. The one or more computer-readable storage memory of claim 16, wherein the computer-executable instructions are further configured to perform the following operations:
evaluating a request from a source related to data access at an address against data access information maintained for chunks of address spaces; and
determining whether the address corresponds to a chunk in which the first source is allowed to access data.

19. The computer-readable storage memory of claim 16, wherein a subset of bits of the address identifies a chunk of a plurality of equal size chunks to which the address corresponds.

20. The computer-readable storage memory of claim 16, wherein at least two of the chunks of address spaces are different sizes from one another, and wherein access designations are maintained in a register set in memory or in a processor location.

* * * * *